United States Patent [19]

Dezelan

[11] 4,191,017
[45] Mar. 4, 1980

[54] MOTOR DISPLACEMENT CONTROL SYSTEM

[75] Inventor: Joseph E. Dezelan, Western Springs, Ill.

[73] Assignee: Caterpillar Tractor Co., Peoria, Ill.

[21] Appl. No.: 18,953

[22] Filed: Feb. 8, 1979

[51] Int. Cl.² .................. F15B 11/20; F15B 13/06
[52] U.S. Cl. ........................ 60/420; 60/427; 60/459; 60/484
[58] Field of Search .......... 60/420, 422, 427, 484, 60/490, 459

[56] References Cited

U.S. PATENT DOCUMENTS 3,984,978  10/1976  Alderson ........................ 60/422

Primary Examiner—Edgar W. Geoghegan
Attorney, Agent, or Firm—Charles E. Lanchantin, Jr.

[57] ABSTRACT

A motor displacement control system (10) has a variable displacement drive motor (38), an auxiliary motor (30), a source (12) of fluid under pressure for operating the motors (30, 38), a first valve (50) for controlling the displacement of the drive motor (38) and maintaining at least a first pressure level thereto, and a second valve (98) for controlling the displacement of the drive motor (38) in response to operation of the auxiliary motor (30) at a second pressure level and overriding the first valve (50). The system is particularly useful on a motor grader.

11 Claims, 1 Drawing Figure

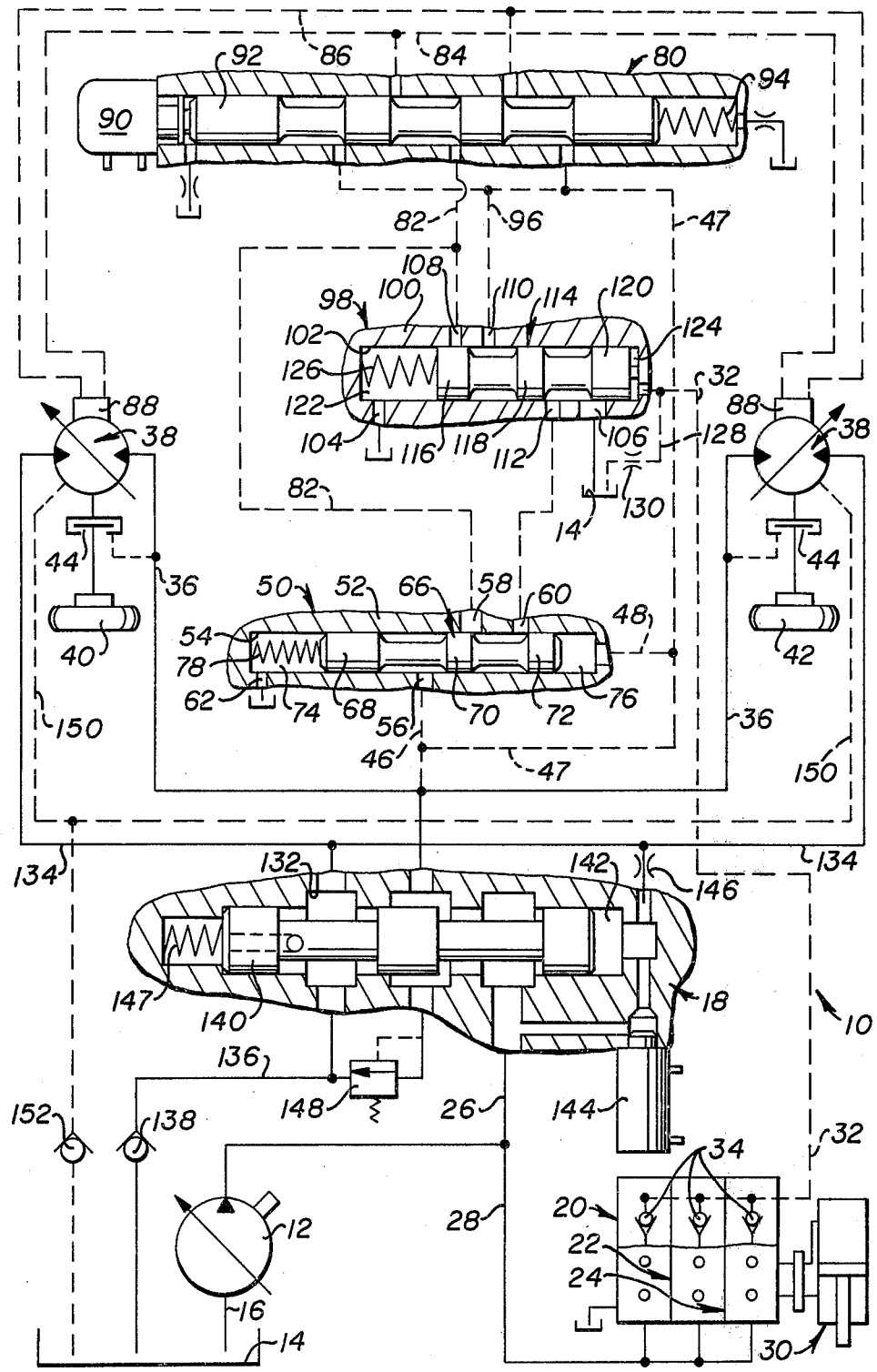

MOTOR DISPLACEMENT CONTROL SYSTEM

DESCRIPTION

TECHNICAL FIELD

This invention relates to a control system for a variable displacement drive motor, and more particularly to a system for reducing the displacement of the drive motor in response to the loading demand requirements of an auxiliary motor.

BACKGROUND ART

Hydraulic systems are known which utilize a single source of fluid under pressure for operating a variable displacement drive motor and an auxiliary motor. For example, U.S. Pat. No. 3,984,978 issued Oct. 12, 1976, to L. L. Alderson describes a variable displacement pump providing fluid through a control system for operating a pair of variable displacement drive motors and also for operating auxiliary equipment. In that example, the drive motors are individually connected to the front wheels of a motor grader, and the auxiliary equipment would usually include one or more motors for powering an earthmoving implement mounted on the motor grader, such as a ripper, moldboard or the like.

Typically, in such motor grader environment, the drive motors are operated substantially continually when front wheel drive power is required. At the same time, the auxiliary equipment is operated only intermittently. As a result, the capacity of the pump is generally dictated for economic reasons on the requirements of the continually operated wheel drive motors. However, when the auxiliary equipment is operated at a time when the variable displacement dirve motors are demanding substantially all the available capacity of the pump, there is often insufficient fluid under the pressure required to operate the auxiliary equipment motor.

In the case of the motor grader control system described in aforementioned U.S. Pat. No. 3,984,978, for example, a pressure compensating spool is incorporated to establish a minimum pressure level for operation of the pair of front wheel drive motors. If the speed of the vehicle is so high as to demand more flow capacity from the pump than is available, then such pressure compensating spool automatically acts through this system to destroke the motors and maintain at least that pressure level. Unfortunately, simultaneous operation of an auxiliary motor would be limited to that same preestablished minimum pressure level, even though a higher pressure is required for satisfactory performance of the loaded auxiliary motor.

The present invention is directed to overcoming one or more of the problems as set forth above.

DISCLOSURE OF INVENTION

In accordance with one aspect of the present invention, a motor displacement control system includes a variable displacement drive motor, an auxiliary motor, a source of pressure fluid for operating the motors, first means for controlling the displacement of the drive motor and maintaining at least a first pressure level, and second means for controlling the displacement of the drive motor in response to operation of the auxiliary motor at a second pressure level and overriding the first means.

Advantageously, the control system of the present invention finds particular utility in a motor grader equipped with a pair of variable displacement front wheel drive motors, and wherein operation of an auxiliary motor at a high pressure is simultaneously possible by valve means which overrides operation of a drive motor minimum pressure level establishing valve, such valve means generally establishing pressure signals for destroking the wheel drive motors.

BRIEF DESCRIPTION OF DRAWING

The sole view is a schematic of a motor displacement control system constructed in accordance with one embodiment of the present invention, with certain valve portions thereof shown in fragmentary section to better illustrate details thereof.

BEST MODE FOR CARRYING OUT THE INVENTION

The sole FIGURE of an exemplary embodiment of this invention will be described hereinafter as being utilized on a vehicle such as a motor grader. However, it can be appreciated that such embodiment can be readily used in other diverse environments having substantially the same capacity matching problems.

The motor displacement control system 10 of the present invention includes a pressure compensated, variable displacement pump 12 connected to a fluid reservoir 14 by an intake conduit 16. The pump can have a present compensation of 24,130 kPa (3500 psi), for example. In general, this engine driven pump supplies hydraulic fluid under pressure to a main flow control valve 18 and to a plurality of implement or auxiliary circuits 20, 22 and 24 via conduits 26 and 28 respectively. As representatively shown by the third auxiliary circuit 24, each of the circuits has an implement or auxiliary motor 30 and is connected to a load signal output line 32 via a check valve 34. The implement motor for the third auxiliary circuit can be for lowering and raising an earthmoving implement, for example.

The flow control valve 18 is a conventional solenoid operated on-off valve, and when in the open position shown conveys fluid from the pump 12 and conduit 26 to a pair of conduits 36 connected to each of two variable displacement, rotary output, hydraulic drive motors 38. Preferably, these motors are of the axial piston, swashplate-operated type. One of the drive motors 38 is adapted to drive a left front wheel 40, while the other is adapted to drive a right front wheel 42, each through an associated output clutch 44 as is diagrammatically illustrated.

A pilot line 46 and associated branch lines 47 and 48 are connected to the conduits 36 leading to the wheel drive motors 38 and to pressure compensating valve means 50. Such valve means controls the displacement of the wheel drive motors and maintains at least a first pressure level thereat, for example a minimum pressure of about 12,400 kPa (1800 psi). The pressure compensating valve means includes a housing 52 having a bore 54, an inlet port 56, a control port 58, an outlet port 60, and a drain port 62. A pressure compensating valve spool 66 having lands 68, 70, and 72 is reciprocally mounted in the bore such that a spring chamber 74 is formed at the left end when viewing the drawing and a pressure or reaction chamber 76 is formed at the right end. A compression spring 78 serves to bias the spool to the right when viewing the drawing against the pressure in the chamber 76.

The control port 58 of the pressure compensating valve means 50 is in fluid communication with a conventional, solenoid-actuated, directional control valve 80 via a line 82. The directional control valve is utilized to control the direction of rotation of the output of the wheel drive motors 38 via first and second control lines 84, 86 which extend to the swashplate controls 88 of the separate motors. In the usual manner, the greater the pressure differential between the control lines 84 and 86, the greater the displacement of the wheel drive motors. As the pressure difference between the lines 84 and 86 is decreased, the swashplates of the wheel drive motors will destroke toward less displacement, and when the pressures become substantially the same in these lines the swashplates will assume a neutral position wherein no torque is supplied to the wheels 40. For a given rotational output speed of the wheel drive motors 38 it is to be appreciated that, as displacement decreases, the flow of hydraulic fluid per unit of time also decreases, and this tends to increase the system pressure in the inlet conduits 36.

The directional control valve 80 has a solenoid 90 at its left end when viewing the drawing which, when actuated, will move a spool 92 to the right against the bias of a spring 94 to a reverse mode of operation. When not actuated, the spool will take a leftward or a forward mode of operation as illustrated. In forward, as shown, the lines 82, 84 are connected and the lines 86 is in fluid communication with a line 96 across the valve spool. On the other hand, in reverse, the lines 84 and 96 are connected and the lines 82 and 86 are connected.

Advantageously, the control system 10 includes priority valve means 98 for overriding the pressure compensating valve means 50 and controlling the displacement of the wheel drive motors 38 in response to operation of one or more of the auxiliary circuits 20, 22, 24 and associated motors 30 at least at a second pressure level below the minimum first pressure level setting of the pressure compensating valve means, and for establishing at least a relatively higher third or load pressure level above the first pressure level setting at the auxiliary motor. For example, the second pressure level setting of the priority valve means 98 can be 11,000 kPa (1600 psi), the first pressure level setting can be 12,400 kPa (1800 psi) as mentioned previously, and the third or load pressure level can be 17,200 kPa (2500 psi).

More specifically, the priority valve means 98 includes a housing 100 having a bore 102, a pair of drain ports 104, 106 opening on the bore, and three control ports 108, 110, 112 also opening on the bore. A priority valve spool 114 having axially spaced lands 116, 118 and 120 is reciprocally disposed in the bore and defines with the housing a spring chamber 122 at the left end when viewing the drawing, and a pressure or reaction chamber 124 at the right end. A compression spring 126 biases the priority spool to the right against pressure in the reaction chamber, and it is to be noted that the reaction chamber is connected to the load signal output line 32 of the auxiliary circuits 20, 22, 24. A branch line 128 having a flow restricting orifice 130 therein is connected to the line 32 and the reservoir 14 for the purpose of draining the reaction chamber 124 so that the priority valve can return to the right to its inactive position, as illustrated, without a fluid trap. Also, ports 108 and 110 are connected to the lines 82 and 96 respectively, and port 112 is connected directly to outlet port 60 of pressure compensating valve means 50.

Fluid directed to the wheel drive motors 38 for operation thereof via the pair of inlet conduits 36 is returned to a drain annulus 132 of the main flow control valve 18 via a pair of outlet conduits 134, and from there back to the reservoir 14 by way of a conduit 136 and a low pressure setting check valve 138. In the wheel drive motor operating position, the main spool 140 is biased to the left as shown by the communication of line pressure in conduit 26 to a reaction chamber 142 via an open solenoid operated shut-off valve 144. The valve 144 can be remotely closed to block flow of pressure fluid to the reaction chamber 142 and to allow the pressure to bleed down therefrom through a flow restricting orifice 146, leading to the outlet conduit 134 thereupon permitting a compression spring 147 to bias spool 140 to the right blocking communication of pressure fluid in line 26 from the inlet conduits 36. Excessive pressure in the inlet conduits 36 is relieved back to the reservoir via the line 136 and a pressure relief valve 148 having a relatively high setting for example about 30,300 kPa (4400 psi). Another pair of drain lines 150 communicate excess fluid in the case of the wheel drive motors back to the reservoir via another low pressure setting check valve 152 in the usual manner.

To the extent thus far described, the pressure compensating valve means 50 operates to alter the displacement of the wheel drive motors 38 to maintain the previously noted minimum pressure level of 12,400 kPa (1800 psi). When the pressure in the inlet conduits 36 to the wheel drive motors is above that pressure level the spool 66 maintains a position substantially as shown. However, if the speed of the vehicle increases, for example, the speed of the wheels increases until the pump 12 cannot meet that flow demand, then the pressure level drops in the conduits 36. This decrease in pressure in the conduits 36 is communicated to the reaction chamber 76 via branch line 48, so that at the aforementioned setting of 12,400 kPa (1800 psi) the middle land 70 of the spool 66 has moved rightwardly sufficient to become substantially radially aligned with the control port 58. In that position the land 70 modulates fluid flow between the ports 56 and 58. Prior to such modulation, it can be appreciated that the first control line 84 to the wheel drive motors is open to the reservoir 14, via directional control valve 80, line 82, port 58, bore 54, port 60, port 112, bore 102, and drain port 106. However, with such modulation the line 82 is no longer in open communication with the reservoir, but rather is meteringly supplied with pressure fluid from the pilot line 46. The valve spool 66 desirably hovers with land 70 radially aligned with port 58 to supply a controlled balancing pressure to line 82 and the first control line 84. Simultaneously, the second control line 86 to the wheel drive motors 38 is maintained at the pressure in the main supply conduit 26 via lines 46 and 47 and the directional control valve 80. Accordingly, the pressure in the control line 84 increases relative to the pressure in the control line 86 to destroke the wheel drive motors, that is to reduce their displacement, thereby maintaining at least the above noted minimum pressure level. It is to be understood that the pressure level setting of the pressure compensating valve means 50 is determined by the spring constant of the spring 78 and the distance the central land 70 must travel from the fully right position of the spool 66 to the metering position.

At certain times in the operation of the control system 10, one of the hydraulic motors 30 associated with a circuit 20, 22, or 24 can require fluid at a higher pressure than the preselected pressure level setting of the pressure compensating valve means 50 to perform its function satisfactorily. Advantageously, the priority valve means 98 allows this need to be met by, in affect, overriding the compensating valve means 50. To this end, the highest pressure in the load signal output line 32 from one of the motors 30 is communicated to the reaction chamber 124 of the priority valve means. When the operating pressure level of the load signal line 32 exceeds the aforementioned 11,000 kPa (1600 psi) setting the priority valve spool 114 shifts to the left when viewing the drawing from the position illustrated against the load of the spring 126. This moves spool land 116 to the left to directly communicate ports 108 and 110 through the bore 102, and blocks communication of the port 112 with the drain port 106. This causes substantially direct communication of the first and second control lines 84, 86 via lines 82, 96 and subsequent destroking of the wheel drive motors 38 to a position of minimum displacement. In effect, the wheel drive motors are free to rotate with the wheels 40, 42 since the clutches 44 remain engaged, but with no torque being transmitted to the wheels, so that the pressure in the main conduits 26, 36 can increase to the point necessary to effectively operate the auxiliary motor 30 at the desired capacity.

The check valves 34 serve to isolate the circuits 20, 22, and 24 from one another, while allowing the highest pressure load signal in any one circuit to be directed to the reaction chamber 124 via signal line 32.

INDUSTRIAL APPLICABILITY

In operation, the pressure compensated, variable displacement pump 12 has a capacity about equal to the demand capacity of the wheel drive motors 38 at a given wheel speed, for example corresponding to a vehicle velocity of 6.4 km/h (4 mph). These front wheel drive motors provide auxiliary power, to supplement the drive torque of the conventionally driven rear wheels, particularly at the low speed end of the vehicles normal operating range, and at progressively higher speeds the swashplate controls 88 destroke the drive motors toward minimum displacement.

Assuming that the system 10 is operating the wheel drive motors 38 at a flow rate less than the aforementioned 6.4 km/h (4 mph) condition, there will usually be sufficient pressure fluid available to provide the normal system pressure of the pump, namely about 24,130 kPa (3500 psi), to the wheel drive motors and to one or more of the auxiliary motors 30 if the auxiliary load pressure is less than 11,000 kPa (1600 psi). The pump of conventional construction, will automatically destroke or move to a minimum displacement condition if the flow demand is low. If the low demand is high, however, the pump will move toward maximum displacement in order to maintain the normal system pressure. Simultaneously, should the pressure drop below 12,400 kPa (1800 psi) in the supply conduits 36 because of the low pressure of the auxiliary circuits 20,22,24 flow demand, then the pressure compensating valve means 50 reduces the displacement of the drive motors to enable priority flow delivery to the auxiliary circuits. Specifically, the pressure compensating valve spool 66 shifts to the right from the position illustrated, aligns the central land 70 with the port 58, meters pressure fluid to the line 82, and decreases the pressure differential between the first and second control lines 84,86. During such conditions the priority valve means 98 is ineffective, such as by remaining in the position shown.

On the other hand, if one of the auxiliary motors 30 requires more pressure corresponding to a load signal pressure above about 11,000 kPa (1600 psi) in the line 32, then the priority valve means 98 functions to provide flow priority to the auxiliary motor. Particularly, priority valve spool 114 moves to the left from the position shown to reduce the pressure differential between control lines 84 and 86, and to cause the swashplates of the wheel drive motors 38 to move toward minimum displacement. Under these circumstances the auxiliary motor can be operated at 20,700 kPa (3000 psi) for example.

Thus, the motor displacement control system 10 of the present invention allows close matching of the capacity of the pump 12 and the motors 30,38 to provide for economical construction, effective priority operation for one of the auxiliary motors 30 at the desired pressure, and yet establishes a minimum effective operating pressure of the wheel drive motors 38 by controllably altering the displacement of the wheel drive motors.

It is to be appreciated that although the pressure level setting of valve 98 is preferably established at about 1380 kPa (200 psi) below that of valve 50 because of the possibility of tolerance variations in the components of these two valves upon their initial pressure level setting, and further because of the possibility of pressure losses in the associated lines and conduits due to high flow rates, it is contemplated that the initial setting of priority valve means 98 can be substantially the same as that of the pressure compensating valve means 50 without departing from the spirit of the present invention.

Other aspects, objects and advantages of this invention can be obtained from a study of the drawings, the disclosure and the appended claims.

I claim:

1. In a motor displacement control system (10) of the type having a variable displacement drive motor (38), an auxiliary motor (30), a source (12) of fluid under pressure for operating the motors (30, 38), the improvement comprising:
    first means (50) for controlling the displacement of the drive motor (38) and maintaining at least a preselected first pressure level thereto; and
    second means (98) for controlling the displacement of the drive motor (38) in response to operation of the auxiliary motor (30) at a preselected second pressure level and overriding said first means (50).

2. The control system (10) of claim 1 wherein said first means (50) includes a pressure compensating valve spool (66) and said second means (98) includes a priority valve spool (114).

3. The control system (10) of claim 1 wherein said preselected second pressure level is below said preselected first pressure level.

4. The control system (10) of claim 1 wherein said drive motor (38) is mounted on and drives a vehicle wheel (40) and said auxiliary motor (30) is adapted to power an implement.

5. The control system (10) of claim 1 wherein said second means (98) includes a housing (100) having a bore (102), a priority valve spool (114) reciprocally mounted within said bore (102), resilient means (126) for biasing the priority valve spool (114) in a first direction, and means (32, 124) for biasing the priority valve spool (114) in a direction opposite said first direction in response to said preselected second pressure level at said auxiliary motor (30).

6. The control system (10) of claim 1 wherein said preselected sound pressure level is substantially the same as said preselected first pressure level.

7. The control system (10) of claim 1 wherein said drive motor (38) has first and second control lines (84, 86) connected thereto, and said second means (98) includes a priority valve means (100, 114, 108, 110) for substantially equalizing pressure in said first and second control lines (84, 86) in response to experiencing said preselected second pressure level thereat.

8. In a vehicle drive and work performing control system (10) of the type having a pair of variable displacement wheel drive motors (38), an auxiliary motor (30), and a pump (12) for supply fluid under pressure for operating the motors (30, 38), the improvement comprising:
  pressure compensating valve spool means (50) for controlling the displacement of the drive motors (38) and maintaining at least a preselected first pressure level at the drive motors (38); and
  priority valve spool means (98) for controlling the displacement of the drive motors (38) with override over the pressure compensating valve spool means (50) in response to operation of the auxiliary motor (30) at a load pressure above a preselected second pressure level, the preselected second pressure level being below said preselected first pressure level.

9. The control system (10) of claim 8 wherein said priority valve spool means (98) reduces the displacement of the drive motors (38) in order to insure that sufficient fluid is available from the pump (12) to operate the auxiliary motor (30) at said load pressure.

10. The control system (10) of claim 9 including a pair of control lines (84, 86) leading to the drive motors (38), said priority valve spool means (98) being of a construction sufficient for substantially equalizing pressure in said control lines (84, 86) in response to said load pressure.

11. The control system (10) of claim 8 wherein said pressure compensating valve spool means (50) includes a spool (66) biased in one direction by a spring (78) and biased in the opposite direction by the pressure level at the drive motors (38), and said priority valve spool means (98) includes a spool (114) biased in one direction by a spring (126) and biased in the opposite direction by said load pressure at the auxiliary motor (30).

* * * * *